United States Patent [19]

Kiyono et al.

[11] Patent Number: 4,788,447
[45] Date of Patent: * Nov. 29, 1988

[54] SWITCH CONTROL DEVICE FOR MOTOR VEHICLE

[75] Inventors: Yasuhiro Kiyono, Nagaokakyo; Yutaka Takeyama, Toyonaka, both of Japan

[73] Assignee: Omron Tateisi Electronics Co., Japan

[*] Notice: The portion of the term of this patent subsequent to Nov. 10, 2004 has been disclaimed.

[21] Appl. No.: 92,396

[22] Filed: Sep. 2, 1987

Related U.S. Application Data

[63] Continuation of Ser. No. 929,851, Nov. 13, 1986, which is a continuation-in-part of Ser. No. 762,471, Aug. 5, 1985, Pat. No. 4,691,116.

[30] Foreign Application Priority Data

Aug. 7, 1984 [JP] Japan .................. 59-165323

[51] Int. Cl.⁴ .............................................. H01H 9/26
[52] U.S. Cl. .................................... 307/10 R; 307/9; 200/5 R; 200/5 A; 340/52 F

[58] Field of Search ................ 307/10 R, 9; 200/5 R, 200/5 A, 61.27, 61, 54; 340/52 F, 52 R, 64

[56] References Cited

U.S. PATENT DOCUMENTS

4,691,116 9/1987 Kiyono et al. .................... 307/10 R
4,705,959 11/1987 Kiyono et al. ......................... 307/9

Primary Examiner—William M. Shoop, Jr.
Assistant Examiner—Sharon D. Logan
Attorney, Agent, or Firm—Wegner & Bretschneider

[57] ABSTRACT

A switch control device for controlling a plurality of switches for actuating apparatuses of a motor vehicle, respectively, including at least one stop mode switch allowed to be operated only in a stop state of the motor vehicle and at least one running mode switch allowed to be operated in a running state of the motor vehicle and provided separately from the stop mode switch such that input operation of the stop mode switch and the running mode switch is regulated on the basis of whether the motor vehicle is in the stop state or in the running state.

16 Claims, 19 Drawing Sheets

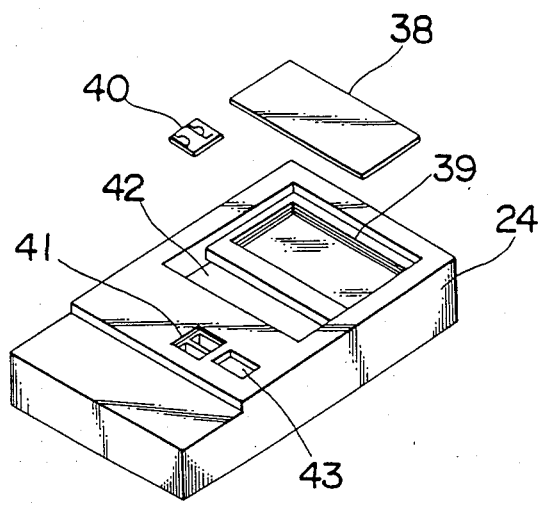
Fig. 1
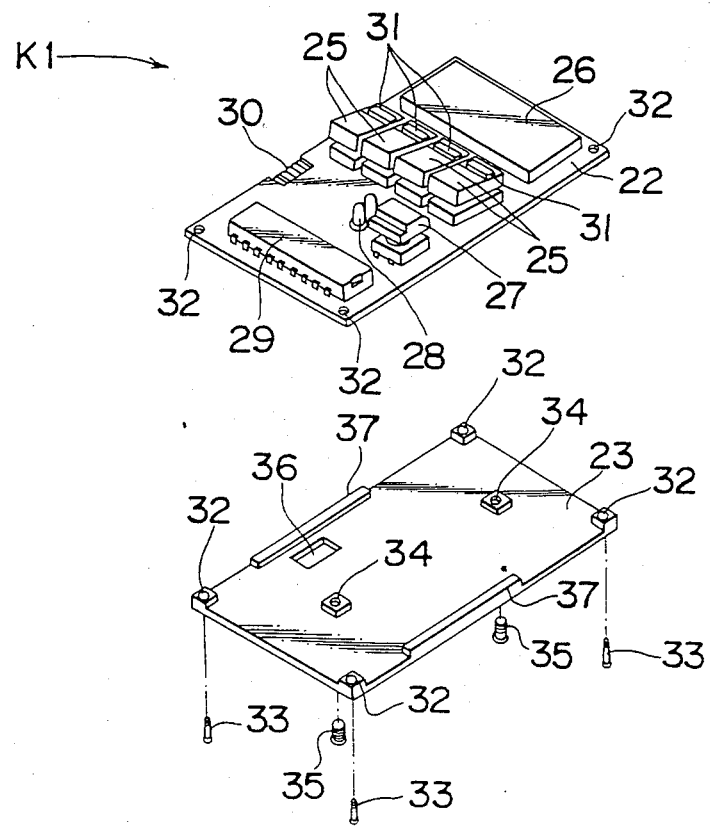

Fig.12
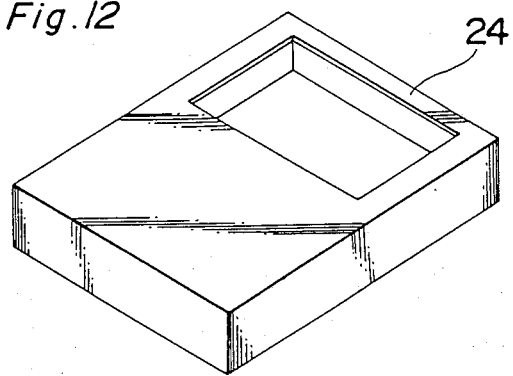
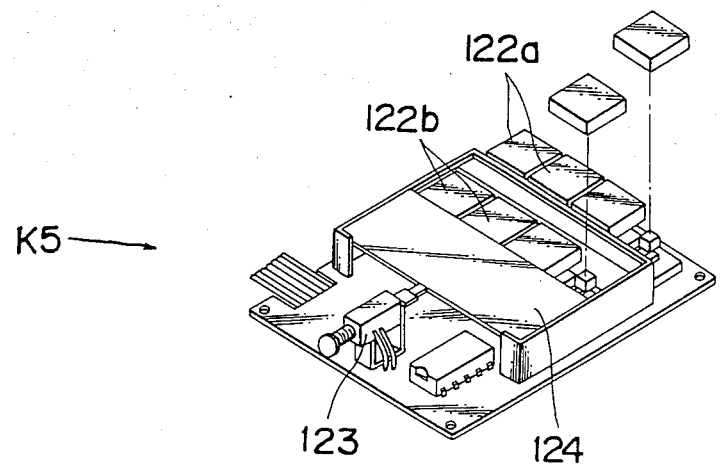
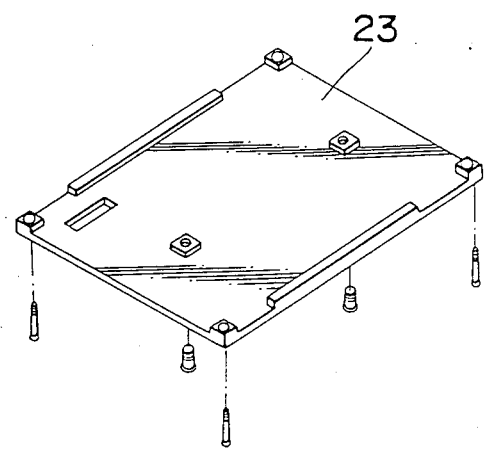

SWITCH CONTROL DEVICE FOR MOTOR VEHICLE

CROSS REFERENCE TO RELATED APPLICATION

This application is a continuation of Ser. No. 929,851, filed Nov. 13, 1986, which in turn is a continuation-in-part of Ser. No. 762,471, filed Aug. 5, 1985, now U.S. Pat. No. 4,691,116.

BACKGROUND OF THE INVENTION

The present invention generally relates to a motor vehicle or the like provided with various switches for automatically actuating a trunk opener, a sun roof, etc. and more particularly, to a switch control device for controlling the switches, which is arranged to regulate input operation of the switches on the basis of whether the motor vehicle is in a stop state or in a running state.

Conventionally, in switch control devices of this kind, a required number of various switches are provided on an instrument panel disposed at a front portion of a cabin of a motor vehicle so as to improve driving efficiency of the motor vehicle and upgrade functions of the motor vehicle.

However, in the known switch control devices, since the switches include stop mode switches permissible to be actuated only at the time of stop of the motor vehicle and running mode switches permissible to be at all times actuated and both the stop mode switches and the running mode switches are provided all together on the instrument panel, it is difficult to select a desired one from among the stop mode switches and the running mode switches, thereby resulting in deterioration of operating efficiency of the switches. Accordingly, the prior art switch control devices have such a drawback that a driver may erroneously operate, during running of the motor vehicle, one stop mode switch for actuating, for example, a trunk opener, thus resulting in a fatal accident. Furthermore, the prior art switch control devices have such an inconvenience that since under a poor driving condition, the driver cannot ensure that the switches have been operated, it is impossible to drive the motor vehicle safely.

SUMMARY OF THE INVENTION

Accordingly, an essential object of the present invention is to provide a switch control device for a motor vehicle, in which stop mode switches and running mode switches are provided separately from one another, with substantial elimination of the disadvantages inherent in conventional switch control devices of this kind.

Another important object of the present invention is to provide a switch control device of the above described type in which, on the basis of whether the motor vehicle is in a stop state or in a running state, either of the stop mode switches and the running mode switches are prevented from being operated improperly.

Still another object of the present invention is to provide a switch control device of the above described type which improves operating efficiency of the stop mode switches and the running mode switches and eliminates positively erroneous operation of the stop mode switches and the running mode switches so as to ensure driving safety of the motor vehicle.

In accomplishing these objects according to one preferred embodiment of the present invention, there is provided a switch control device for a motor vehicle provided with a plurality of switches for actuating apparatuses of said motor vehicle, respectively, the improvement comprising: at least one stop mode switch which is allowed to be operated only in a stop state of said motor vehicle; and at least one running mode switch which is allowed to be operated in a running state of said motor vehicle and is provided separately from said stop mode switch; said switches being constituted by said stop mode switch and said running mode switch such that input operation of said stop mode switch and said running mode switch is regulated on the basis of whether said motor vehicle is in said stop state or in said running state.

In accordance with the present invention, improper input operation of either of the stop mode switches and the running mode switches is regulated on the basis of whether the motor vehicle is in the stop state or in the running state. Thus, during running of the motor vehicle, input operation of the stop mode switches is not allowed to be performed, but input operation of only the running mode switches is allowed to be performed. Accordingly, since erroneous operation of the switches is completely eliminated, the input operation of the switches can be performed safely, reliably and easily.

BRIEF DESCRIPTION OF THE DRAWINGS

These objects and features of the present invention will become apparent from the following description taken in conjunction with the preferred embodiments thereof with reference to the accompanying drawings, in which:

FIG. 1 is an exploded perspective view of a switch control device according to a first embodiment of the present invention;

FIGS. 12 and 13 are views similar to FIGS. 1 and 2, respectively, particularly showing a fifth embodiment of the present invention.

Before the description of the present invention proceeds, it is to be noted that like parts are designated by like reference numerals throughout several views of the accompanying drawings.

DETAILED DESCRIPTION OF THE INVENTION

Figure 2:
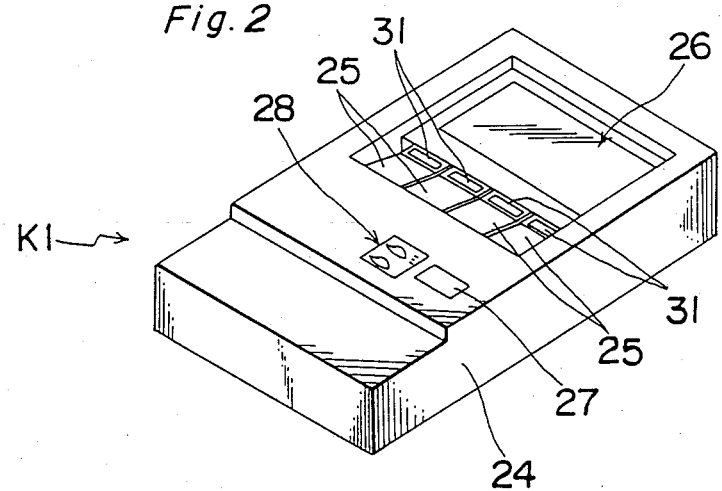
FIG. 2 is a perspective view of the switch control device of FIG. 1.

Referring now to the drawings, there is shown in FIGS. 1 and 2, a switch control device K1 for a motor vehicle, according to a first embodiment of the present invention. The switch control device K1 is constituted by a printed circuit board 22 having various control components mounted thereon, a casing 24 for accommodating the printed circuit board 22 and a base 23 for securing the printed circuit board 22 to the casing 24.

A plurality of push-button switches 25 corresponding to various apparatuses of the motor vehicle, a liquid crystal display (LCD) 26, a mode changeover switch 27 for effecting changeover between a running mode and a stop mode of the motor vehicle, two light emitting diodes (LEDs) 28 for displaying, through the energizing, marks indicative of the running mode and the stop mode, respectively, and a control circuit 29 for controlling input and output signals of these electrical components 25 to 28 are mounted on the front face of the printed circuit board 22. The switch control device K1 further includes input and output flexible cables 30.

In the case where the mode changeover switch 27 has been set to the stop mode, marks indicative of functions to be performed in a stop state of the motor vehicle, for example, marks indicative of functions of actuating a trunk opener, actuating a fuel lid opener, parking, etc. are displayed, as stop mode functions, by the LCD 26 so as to correspond to the push-button switches 25, respectively. Meanwhile, in the case where the mode changeover switch 27 has been set to the running mode, marks indicative of functions other than those of the stop mode functions, for example, marks indicative of functions of actuating an antenna, actuating a sun roof, actuating a rear heater, etc. performable in both the stop state and a running state of the motor vehicle are displayed, as running mode functions, by the LCD 26 so as to correspond to the push-button switches 25, respectively. Each of the push-button switches 25 is provided with a push-button LED 31 for displaying, through its energizing, actuation of each of the push-button switches 25.

The base 23 and the printed circuit board 22 have a shape of an identical rectangular plate. The base 23 having the printed circuit board 22 mounted on its front face is secured to the casing 24 by screwing four screws 33, through holes 32 formed at four corner portions of the base 23 and holes 32 formed at four corner portions of the printed circuit board 22, into the casing 24. The base 23 is formed with two threaded holes 34 such that the switch control device K1 is secured to the motor vehicle by screwing screws 35 into the threaded holes 34. The base 23 is formed with a rectangular opening 36 for inserting therethrough the cables 30. A pair of rectangular projections 37 engageable with the casing 24 are formed at opposite side portions of the front face of the base 23.

Meanwhile, the casing 24 has a rectangular display window 39 formed on a front face thereof. The display window 39 is provided with a transparent protective plate 38 confronting the LCD 26 of the printed circuit board 22. The casing 24 further has a rectangular display window 41 formed on the front face. The display window 41 is provided with a mode display film 40 confronting the LEDs 28. Furthermore, a rectangular opening 42 for exposing therethrough the push-button switches 25 on the front face of the casing 24 is provided adjacent to the display windows 39 and 41. Moreover, the casing 24 is formed with a rectangular opening 43 for exposing therethrough the mode changeover switch 27 on the front face of the casing 24.

Figure 3:
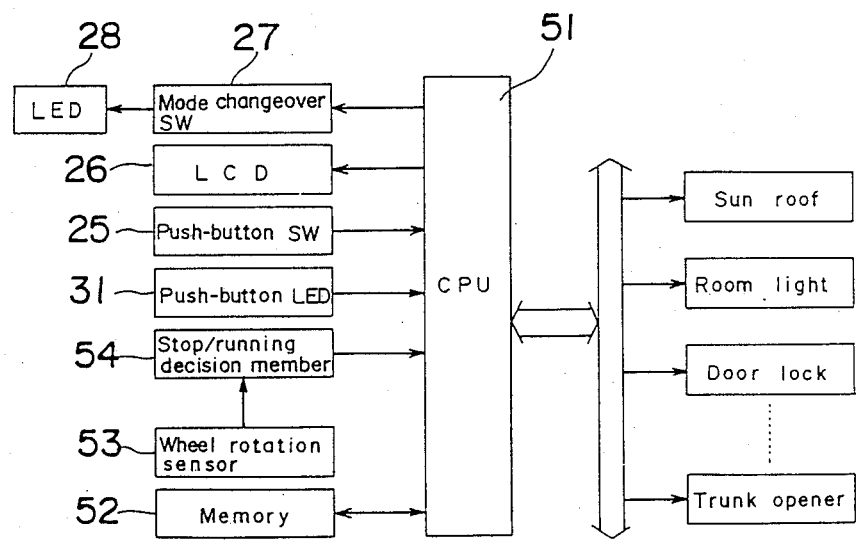
FIG. 3 is a block diagram of a control circuit employed in the switch control device of FIG. 1.

Referring to FIG. 3, there is shown a control circuit employed in the switch control device K1. The control circuit includes a central processing unit (CPU) 51 for controlling respective apparatuses of the motor vehicle in accordance with a program stored in a memory 52, a wheel rotation sensor 53 for detecting whether wheels of the motor vehicle are in a halt state or in a rotational state, and a stop/running decision member 54 for deciding whether the motor vehicle is in the stop state or in the running state on the basis of a detection signal from the wheel rotation sensor 53.

Figure 4A:
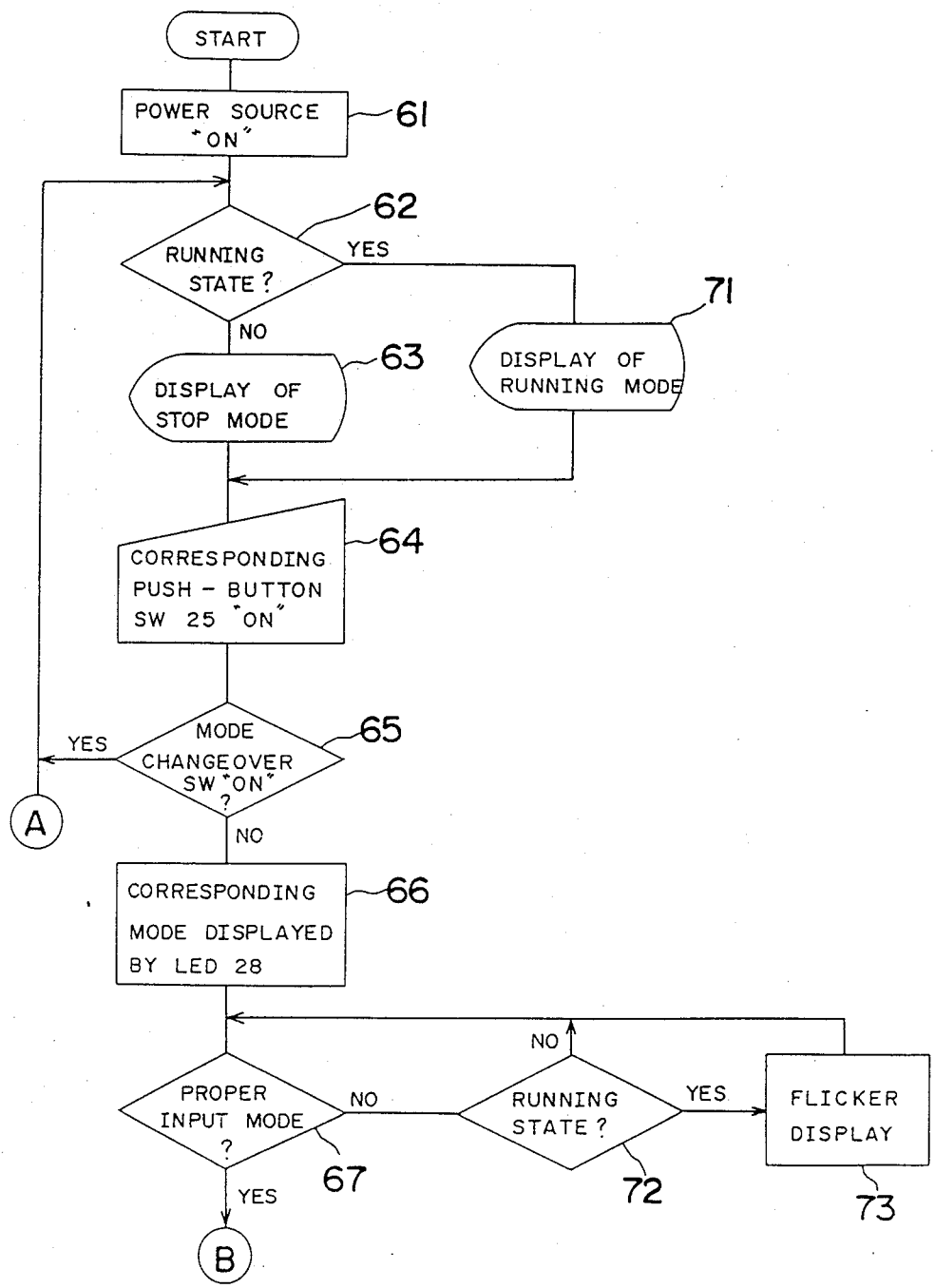
FIGS. 4a and 4b are flow charts showing a processing sequence of the switch control device of FIG. 1.
Figure 4B:
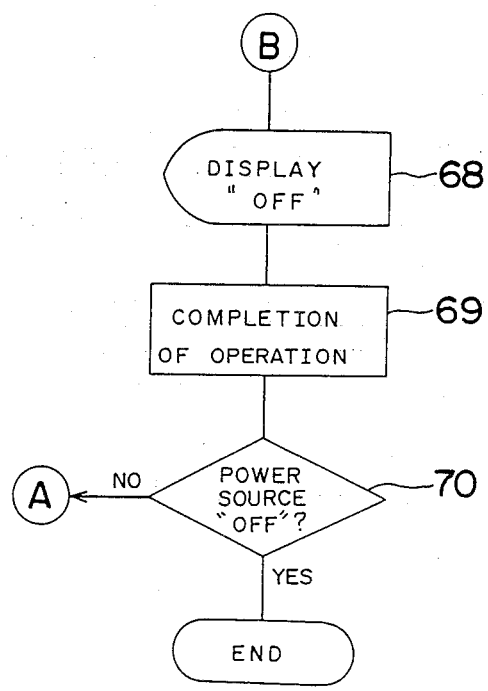

Hereinbelow, a processing sequence of the switch control device K1 of the above described arrangement will be described with reference to flow charts of FIGS. 4a and 4b. Initially, when a power source of the switch control device K1 has been turned on at step 61 in the case where the motor vehicle is in the stop state, a decision is made at step 62 as to whether the motor vehicle is in the stop state or in the running state. In the case where a decision has been made at step 62 that the motor vehicle is in the stop state, one of the LEDs 28 displays, through its energizing, a mark indicative of the stop mode and the marks indicative of the stop mode functions are displayed by the LCD 26 at step 63. Then, at step 64, a desired one of the push-button switches 25 corresponding to the stop mode functions, respectively is depressed. If a mark of a desired function is not displayed by the LCD 26 at step 63, the mode changeover switch 27 is depressed at step 65 so as to change over the motor vehicle to the running mode. If the desired push-button switch 25 corresponding to one stop mode function of, for example, actuating the trunk opener has been depressed at step 64, the trunk of the motor vehicle is opened automatically and a push-button LED 31 corresponding to the desired push-button switch 25 is turned on at step 66, so that it becomes possible to ensure that the desired push-button switch 25 is turned on. Subsequently, when the trunk has been closed at step 67, the push-button LED 31 is turned off at step 68. At step 69, an input operation for actuating the trunk opener is completed. If it is found at step 70 that the power source of the switch control device K1 is not turned off, the program flow proceeds to step 62 so as to repeat the same procedures as described above. If it is unnecessary to operate the push-button switches 25 any more, it is found at step 70 that the power source of the switch control device K1 is turned off, so that the program flow proceeds to "END" designation.

Then, in the case where the motor vehicle is in the running state, the other one of the LEDs 28 displays, through its energizing, a mark indicative of the running mode on the basis of a signal representing a decision that the motor vehicle is in the running state at step 71. At the same time, the marks indicative of the running mode functions of actuating the sun roof, actuating a room light, actuating a door lock, etc. are displayed by the LCD 26. Thereafter, when a desired one of the push-button switches 25 corresponding to the running mode functions, respectively has been depressed at step 64, the sun roof, for example, is automatically opened or closed and a push-button LED 31 corresponding to the desired push-button switch 25 is turned on, so that it becomes possible to ensure that the desired push-button switch 25 is turned on. Meanwhile, in the case where the motor vehicle is brought to a halt in the course of automatic operation of the apparatuses (e.g., the sun roof), for example, at an intersection due to a red traffic signal, the motor vehicle is changed over to the stop mode after completion of automatic operation of the apparatuses.

Meanwhile, in the case where the motor vehicle is undesirably caused to start running while the trunk is open, it is found at step 67 that the input mode is improper. Then, at step 72, the corresponding LED 28 displays, through its energizing, the mark of the stop mode. Subsequently, at step 73, the push-button LED 31 corresponding to the push-button switch 25 for actuating the trunk opener starts flickering so as to warn the driver of the motor vehicle that the trunk is not closed properly.

Furthermore, in the case where the running mode functions are performed during stop of the motor vehicle, the mode changeover switch 27 is depressed and thus, the motor vehicle is changed over to the running mode. On the other hand, even if the mode changeover switch 27 is depressed during running of the motor vehicle, the motor vehicle is not changed over to the stop mode.

Figure 5:
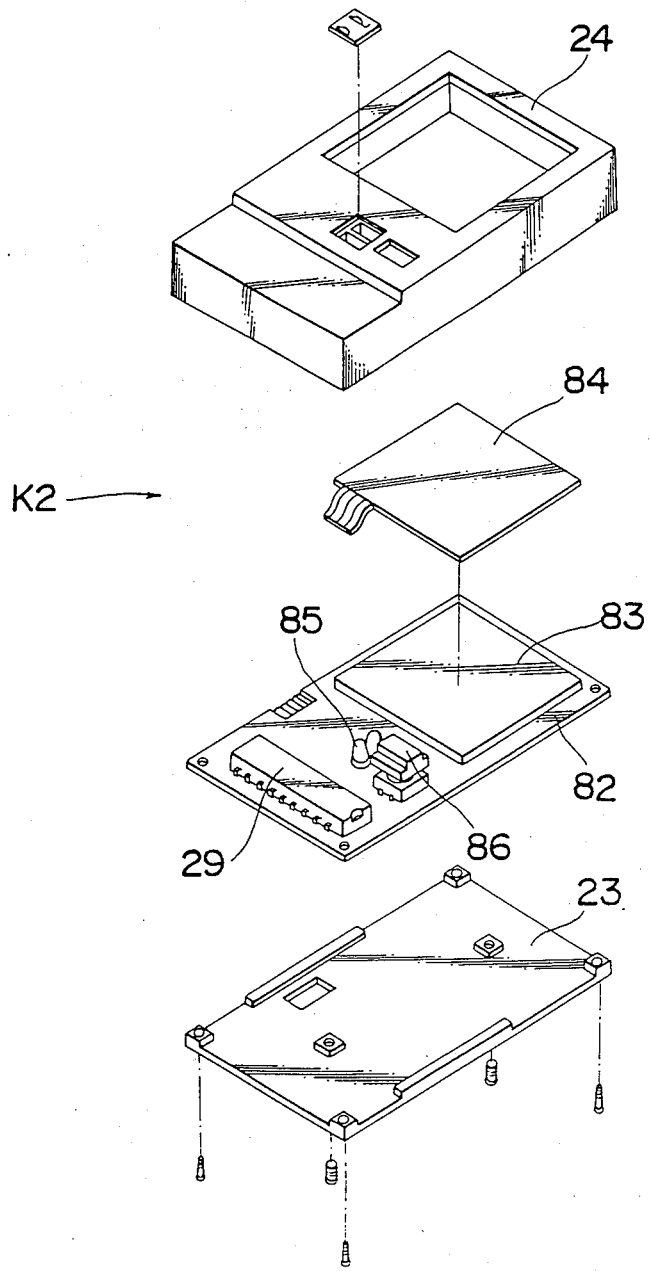
FIGS. 5 and 6 are views similar to FIGS. 1 and 2, respectively, particularly showing a second embodiment of the present invention.
Figure 6:
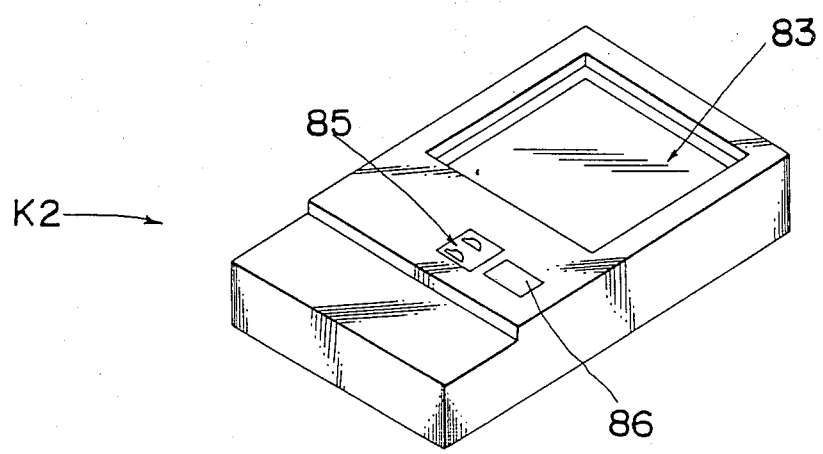

Referring to FIGS. 5 and 6, there is shown a touch panel type switch control device K2 according to a second embodiment of the present invention. The switch control device K2 includes a printed circuit board 82 having an LCD 83 mounted thereon such that a transparent touch panel switch 84 having a rectangular platelike shape is placed on the front face of the LCD 83. When an LED 85 for the stop mode is turned on, the marks indicative of the various stop mode functions are displayed by the LCD 83. Meanwhile, when another LED 85 for the running mode is turned on, the marks indicative of the various running mode functions are displayed by the LCD 83. A desired one of the stop mode functions or the running mode functions is inputted to the switch control device K2 by depressing a portion of the front face of the touch panel switch 84, which portion is disposed on the mark of the desired one of the stop mode functions or the running mode functions displayed by the LCD 83. By using a mode changeover switch 86, it becomes possible to effect changeover between the stop mode and the running mode such that the mark of one of the stop mode and the running mode is displayed by the corresponding LED 85.

Figure 7:
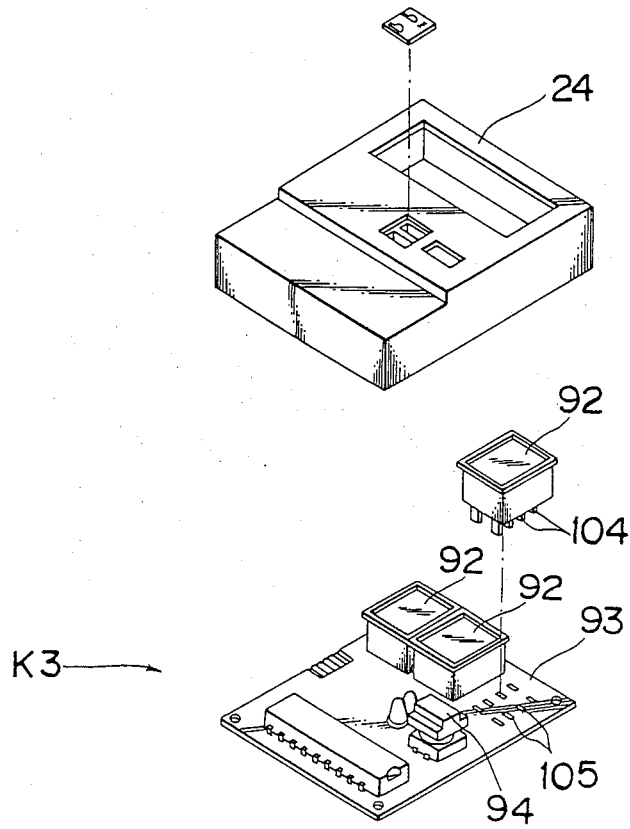
FIGS. 7 and 8 are views similar to FIGS. 1 and 2, respectively, particularly showing a third embodiment of the present invention.
Figure 8:
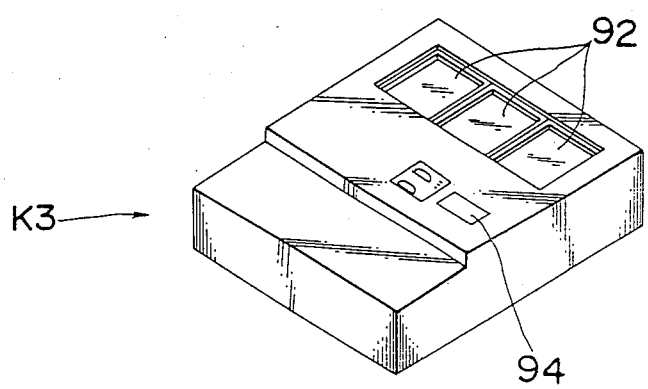
Figure 9:
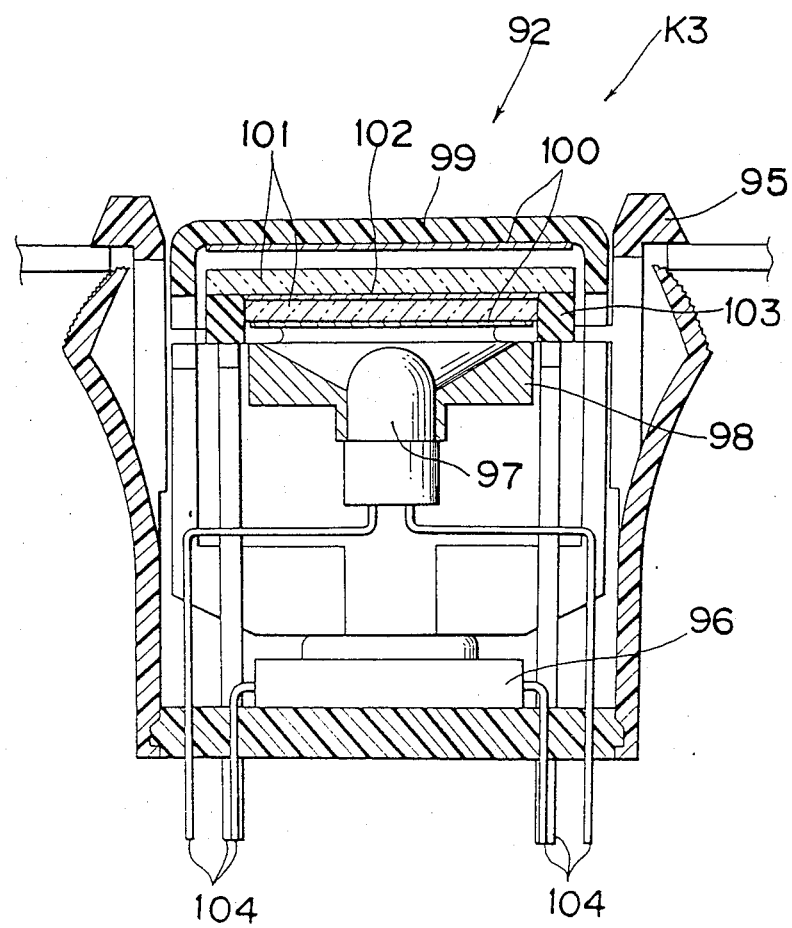
FIG. 9 is a vertical sectional view of a pushbutton switch employed in the switch control device of FIG. 7.

Referring to FIGS. 7 to 9, there is shown a switch control device K3 according to a third embodiment of the present invention. The switch control device K3 includes a plurality of push-button switches 92 placed independently of one another on the front face of a printed circuit board 93. Each of the push-button switches 92 has a built-in LCD for displaying one of the marks indicative of the stop mode functions or the running mode functions. Namely, one of the marks indicative of the stop mode functions or the running mode functions designated by a mode changeover switch 94 is displayed on the front face of each of the push-button switches 92. A desired one of the stop mode functions or the running mode functions is inputted to the switch control device K3 by depressing the front face of the push-button switch 92 corresponding to the desired one of the stop mode functions or the running mode functions such that the depressed push-button switch 92 is lit up with high brightness. More specifically, as shown in FIG. 9, each of the push-button switches 92 includes a casing 95 in which a switch 96, a light emitting lamp 97 and a reflecting plate 98 are incorporated. Polarizing plates 100, glass plates 101 and a liquid crystal plate 102 are mounted on the upper portion of the casing 95 so as to be enclosed by a push button 99. Reference numerals 103, 104 and 105 represent a connector made of electrically conductive rubber, terminals and terminal holes, respectively.

Figure 10:
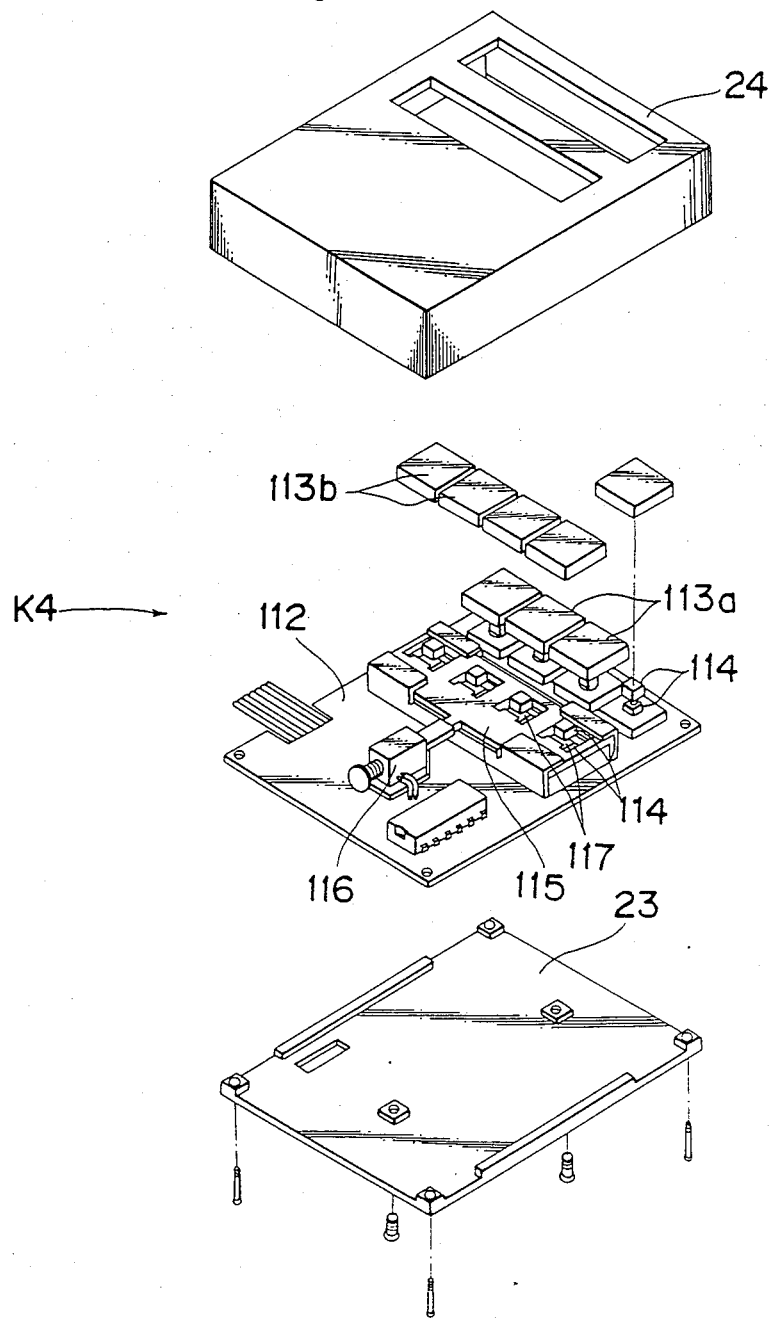
FIGS. 10 and 11 are views similar to FIGS. 1 and 2, respectively, particularly showing a fourth embodiment of the present invention.
Figure 11:
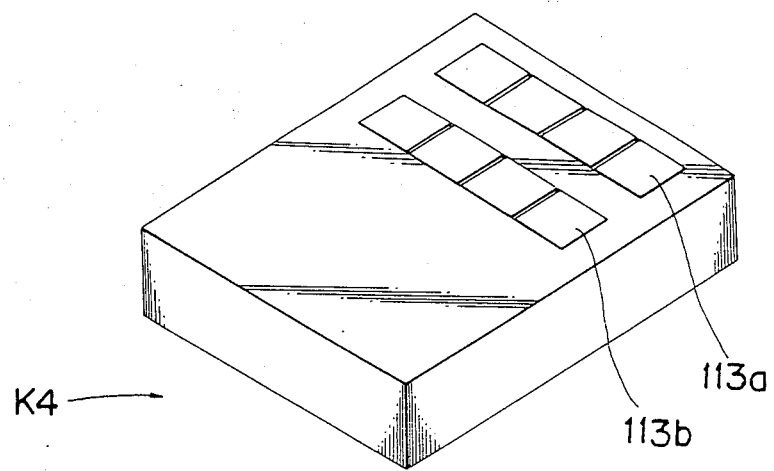

Referring further to FIGS. 10 and 11, there is shown a switch control device K4 according to a fourth embodiment of the present invention. The switch control device K4 includes a plurality of push-button switches 113a for the respective running mode functions and a plurality of push-button switches 113b for the respective stop mode functions. The push-button switches 113a are arranged in a row at an upper portion of the front face of a printed circuit board 112, while the push-button switches 113b are arranged, on the front face of the printed circuit board 112, in a row downwardly of the push-button switches 113a. Each of the push-button switches 113a and 113b includes switch contact portions 114 confronting each other. A shielding plate 115 is provided at the push-button switches 113b so as to be retractably inserted between the switch contact portions 114 of the push-button switches 113b by a solenoid 116 such that switching operation of the push-button switches 113b is regulated by the shielding plate 115. Namely when the motor vehicle is in the stop state, the shielding plate 115 is disposed at its retracted position and thus, it is possible to depress all the push-button switches 113a and 113b. Meanwhile, when the motor vehicle is in the running state, the shielding plate 115 is advanced so as to prevent the stop mode functions from being inputted to the switch control device K4. Thus, each of the tongue pieces 117 formed in openings of the shielding plates 115, respectively is inserted between the switch contact portions 114 of each of the push-button switches 113b so as to prevent the push-button switches 113b for the stop mode functions from being depressed such that only the running mode functions are allowed to be inputted to the switch control device K4.

Figure 13:
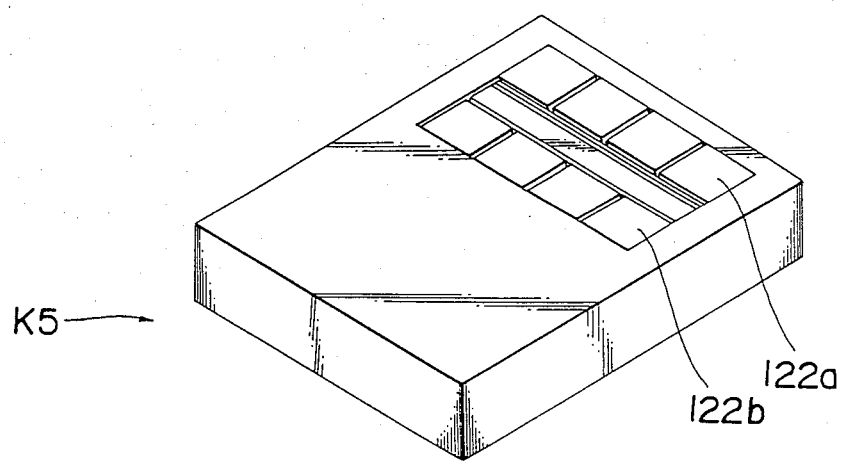

Referring to FIGS. 12 and 13, there is shown a switch control device K5 according to a fifth embodiment of the present invention. The switch control device K5 includes a plurality of push-button switches 122a for the respective running mode functions and a plurality of push-button switches 122b for the respective stop mode functions. In a manner similar to that of the switch control device K4, the push-button switches 122a are arranged in a row at an upper portion of the front face of a printed circuit board, while the push-button switches 122b are arranged, on the front face of the printed circuit board, in a row downwardly of the push-button switches 122a. A shielding plate 124 coupled with a solenoid 123 is provided so as to retractably cover wholly front faces of the push-button switches 122b such that switching operation of the push-button switches 122b is regulated by the shielding plate 124. Namely, when the motor vehicle is in the stop state, the shielding plate 124 is disposed at its retracted position and thus, it is possible to depress all the push-button switches 122a and 122b. Meanwhile, when the motor vehicle is in the running state, the shielding plate 124 is advanced so as to cover wholly the front faces of the push-button switches 122b such that the push-button switches 122b for the stop mode functions are prevented from being depressed, whereby only the push-button switches 122a for the running mode functions are allowed to be depressed.

Figure 14:
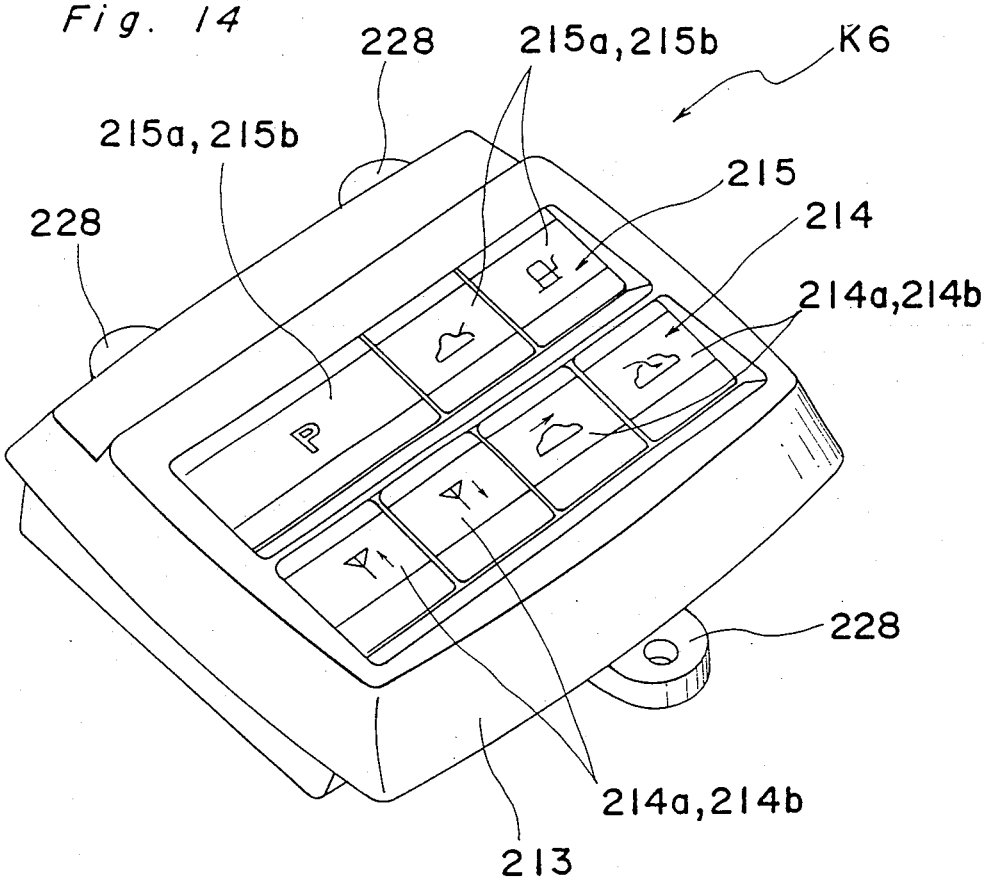
FIG. 14 is a perspective view of a switch control device according to a sixth embodiment of the present invention.
Figure 15:
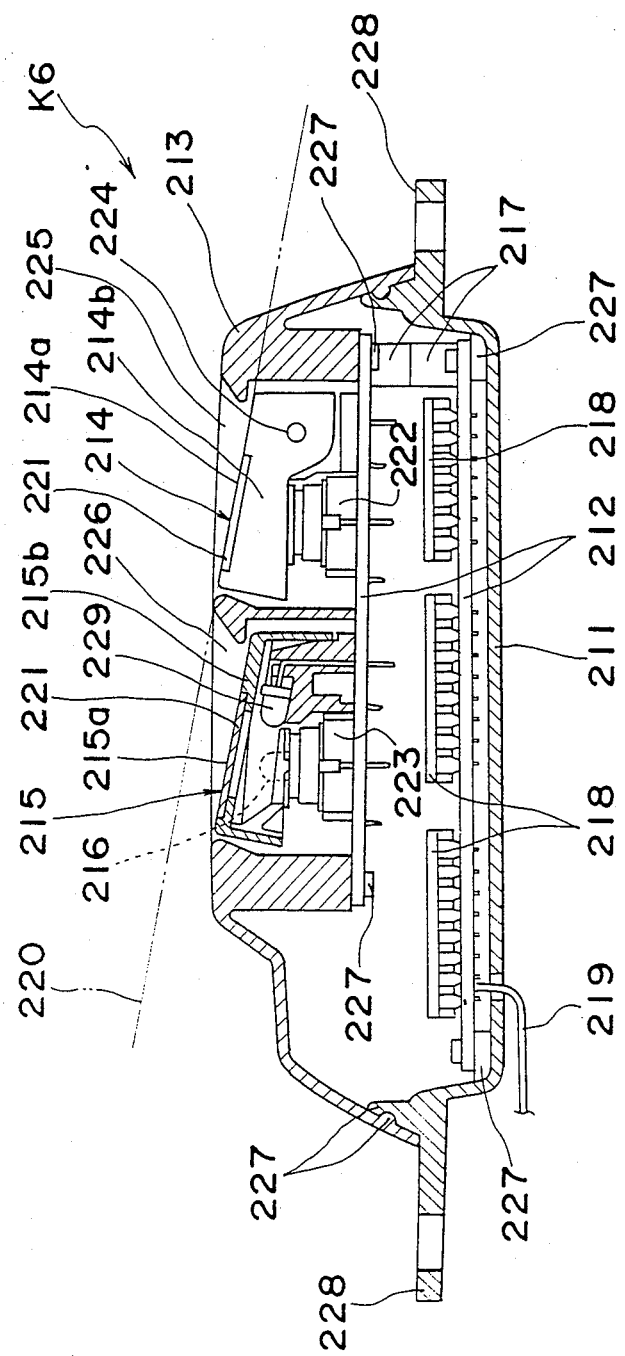
FIG. 15 is a sectional view of the switch control device of FIG. 14.

Referring to FIGS. 14 and 15, there is shown a switch control device K6 according to a sixth embodiment of the present invention. The switch control device K6 is mounted on, for example, a roof panel above a driver's seat of the motor vehicle and is constituted by a base 211, upper and lower printed circuit boards 212 each having various control components mounted thereon and a casing 213 for covering the base 211 and the upper and lower printed circuit boards 212. A plurality of hinge type push-button switches 214 and 215 for operating various apparatuses of the motor vehicle, light emitting diodes (LEDs) 216 for displaying operational states of the push-button switches 214 and 215, respectively, electrically conductive connectors 217, control circuits 218 and a flexible cable 219 for delivering signals out of the switch control device K6 are mounted on the upper and lower printed circuit boards 212.

The push-button switches 214 and 215 are stepwise provided in two rows extending in parallel with each other. Each of the push-button switches 214 has a push face 214a, while each of the push-button switches 215 has a push face 215a. The push faces 214a and 215a are angularly disposed in parallel with an imaginary operational plane 220 suitable for depressing the push faces 214a and 215a at the time when the switch control device K6 is mounted on the roof panel, etc. The push face 214a is disposed on the imaginary operational plane 220, while the push face 215a is disposed downwardly of the imaginary operational plane 220 in FIG. 15. Thus, the push-button switches 214 having the shallower push face 214a can be operated more easily than the push-button switches 215 having the deeper push face 215a. Hence, the push-button switches 214 are used as running mode switches operable in the running state of the motor vehicle so as to actuate, for example, a room light, a sun roof, an antenna, a rear heater, etc. Meanwhile, the push-button switches 215 are used as stop mode switches operable in the stop state of the motor vehicle so as to actuate, for example, a trunk opener, parking, a door, a fuel lid opener, etc. To this end, filters 221 having figures depicting symbolically operations and processings of the apparatuses corresponding to the push-button switches 214 and 215, respectively are attached to upper portions of the push-button switches 214 and 215, respectively, which figures are printed on the filters 221 or are printed on seals to be bonded to the filters 221.

Furthermore, each of the push-button switches 214 includes a push button 214b and a switch body 222 disposed inwardly of the push button 214b, while each of the push-button switches 215 includes a push button 215b and a switch body 223 disposed inwardly of the push button 215b. The push button 214b and the switch body 222 are integrally coupled with each other, while the push button 215b and the switch body 223 are integrally coupled with each other. Each of the push-button switches 214 and 215 further includes a pivotal pin 224 for pivotally supporting one end of each of the push buttons 214b and 215b such that the push buttons 214b and 215b can be inclined upwardly and downwardly in FIG. 15. By depressing the push buttons 214b and 215b, the switch bodies 222 and 223 are turned on and off, respectively. These switch bodies 222 and 223 and the control circuits 218 are soldered onto the upper and lower printed circuit boards 218 in accordance with circuit patterns of the upper and lower printed circuit boards 218.

The casing 213 is formed with an opening 225 for exposing the push faces 214a of the push buttons 214b and an opening 226 for exposing the push faces 215a of the push buttons 215b such that the push buttons 214b and 215b confront the LEDs 216 of the push-button switches 214 and 215, respectively. Engageable portions 227 of the base 211, the upper and lower printed circuit boards 212 and the casing 213 are brought into engagement with each other and thermally caulked, so that the base 211, the upper and lower printed circuit boards 212 and the casing 213 are integrally assembled with each other such that the push-button switches 214 and 215 are depressably exposed in the openings 225 and 226.

The base 211 has three mounting portions 228 to be attached to the roof panel disposed at the front portion of the cabin of the motor vehicle. Reference numeral 229 denotes an LED for nighttime lighting. The LED 229 is provided for each of the push buttons 214b and 215b. The LEDs 229 are turned on in response to turning on of a light switch in the cabin. The LEDs 229 are so provided as to illuminate the push buttons 214b and 215b laterally. It is so arranged that necessary ones of the push-button switches 214 and 215 are illuminated by the LEDs 229, for example, only the running mode switches 214 are illuminated by the LEDs 229 during running of the motor vehicle. The LEDs 229 lower luminance of the push faces 214a and 215a properly and lessen dazzle at night. Furthermore, the LEDs 229 make light emission of the LEDs 216 more vivid when the LEDs 216 are turned on. In this case, it is desirable that luminescent colors of the LEDs 216 and 229 are divided into a red color group and a green color group, respectively.

Figure 16:
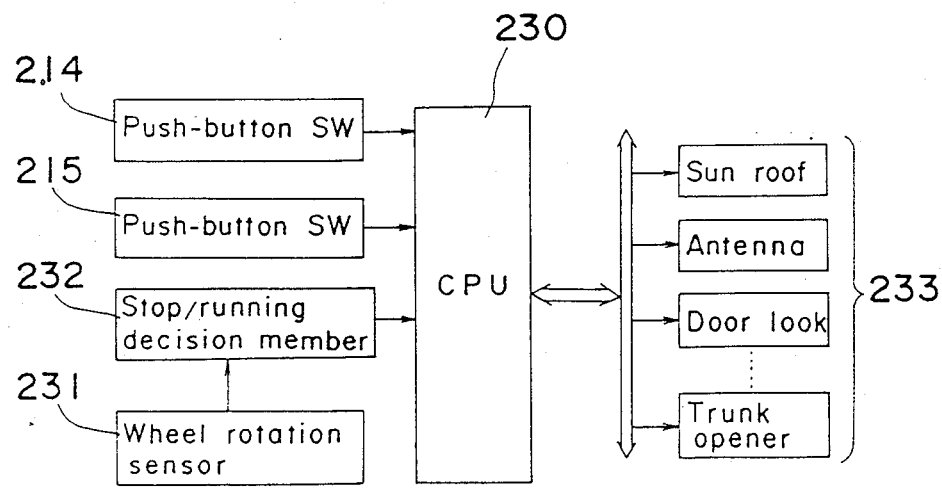
FIG. 16 is a block diagram of a control circuit employed in the switch control device of FIG. 14.

Referring to FIG. 16, there is shown a control circuit employed in the switch control device K6. The control circuit includes a central processing unit (CPU) 230, a wheel rotation sensor 231 and a stop/running decision member 232. A decision signal for deciding whether the motor vehicle is in the stop state or in the running state is inputted to the CPU 230 by the wheel rotation sensor 231 and the stop/running decision member 232. When the motor vehicle is in the running state, the CPU 230 prohibits processing of an input signal of the stop mode switches 215. Meanwhile, when one of the push-button switches 214 and 215 has been depressed, the CPU 230 actuates one of apparatuses 233 of the motor vehicle corresponding to the depressed one of the push-button switches 214 and 215.

Hereinbelow, a processing sequence of the switch control device K6 of the above described arrangement will be described with reference to a flow chart of FIG. 17. Initially, when a power source of the switch control device K6 has been turned on at step s1, a decision is made at step s2 as to whether or not the motor vehicle is in the running state. In the case of "NO" at step s2, processing of an input signal of an arbitrary one of the push-button switches 214 and 215 is allowed at step s3. Thus, when the arbitrary one of the push-button switches 214 and 215 has been depressed at step s3, one of the apparatuses 233 corresponding to the input signal of the depressed one of the push-button switches 214 and 215 is actuated and, at the same time, one of the LEDs 216 corresponding to the depressed one of the push-button switches 214 and 215 is turned on so as to display the corresponding one of the functions of the push-button switches 214 and 215. Subsequently, after predetermined operation and processing has been performed at step s4, operation of the corresponding one of the apparatuses 233 is completed at step s5 and then, the corresponding one of the LEDs 216 is turned off. Thereafter, the power source is turned off at step s6 and thus, predetermined processing of the corresponding one of the apparatuses 233 is completed.

Meanwhile, in the case of "YES" at step s2, a circuit for prohibiting input of the stop mode switches 215 is actuated at step s7. In this case, an arbitrary one of the push-button switches 214 and 215 is depressed at step s8. Then, a decision is made at step s9 as to whether or not the depressed one of the push-button switches 214 and 215 is the running mode switch. In the case of "YES" at step s9, the program flow proceeds to step s4. On the other hand, in the case of "NO" at step s9, processing of the input signal of the depressed stop mode switch is prohibited at step s10 followed by step s5. Therefore, since accidental operation of the apparatuses 233 is prevented at step s10, safety of the motor vehicle is ensured.

Figure 18:
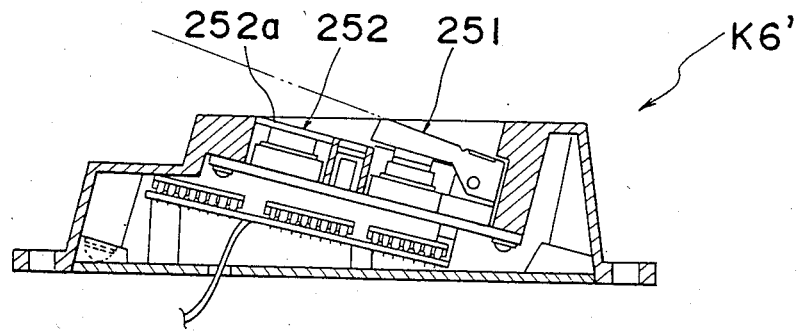
FIGS. 18 and 19 are views similar to FIGS. 15 and 14, respectively, showing a modification thereof.
Figure 19:
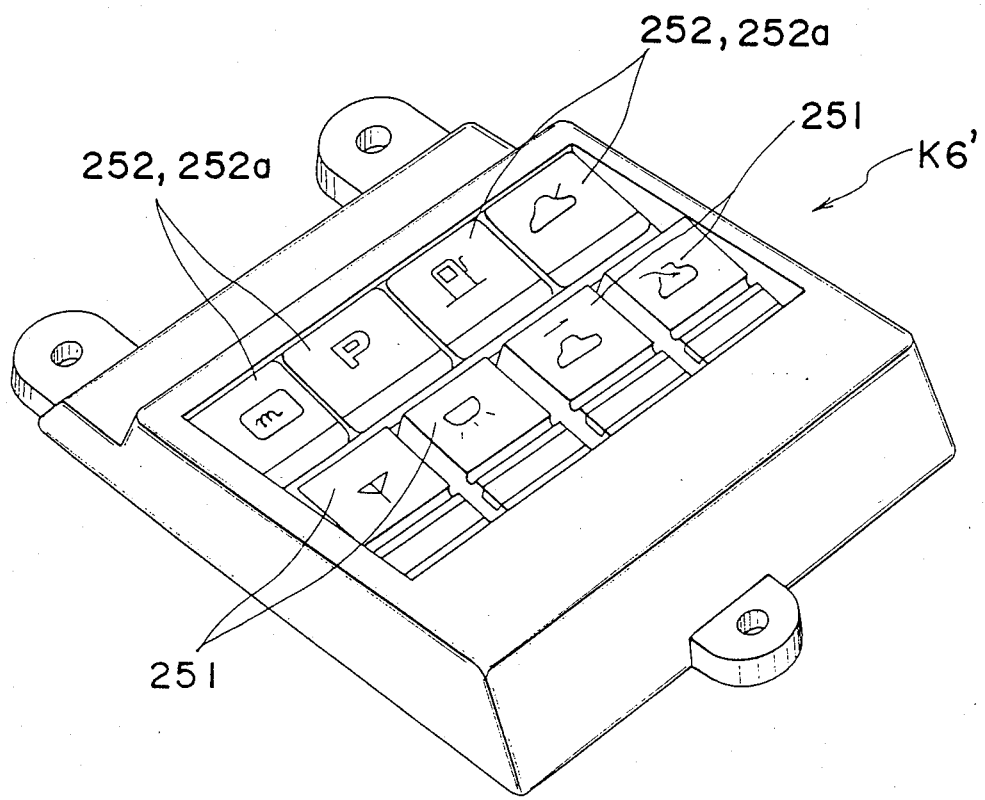

FIGS. 18 and 19 show a switch control device K6' which is a modification of the switch control device K6. In the modified switch control device K6', push-button switches 251 and 252 are stepwise provided in two rows such that a push face of each of the push-button switches 252 is disposed downwardly of a plane containing a push face of each of the push-button switches 251 in FIG. 18 by employing membrane switches 252a as the push-button switches 252.

In the switch control device K6, since the stop mode switches and the running mode switches are separately provided stepwise, the stop mode switches and the running mode switches can be discriminated quite easily. Furthermore, since the push face of each of the stop mode switches is disposed deeper than the push face of each of the running mode switches such that the stop mode switches are depressed with more difficulty than the running mode switches, such an undesirable phenomenon is eliminated that one stop mode switch and one running mode switch disposed adjacent to each other are depressed simultaneously, thereby resulting in positive reduction of erroneous operations of the switches. Accordingly, such a danger is obviated that the trunk opener, etc. are actuated during running of the motor vehicle, thereby ensuring safety of the motor vehicle and resulting in accurate input operation of the running mode switches.

Figure 20:
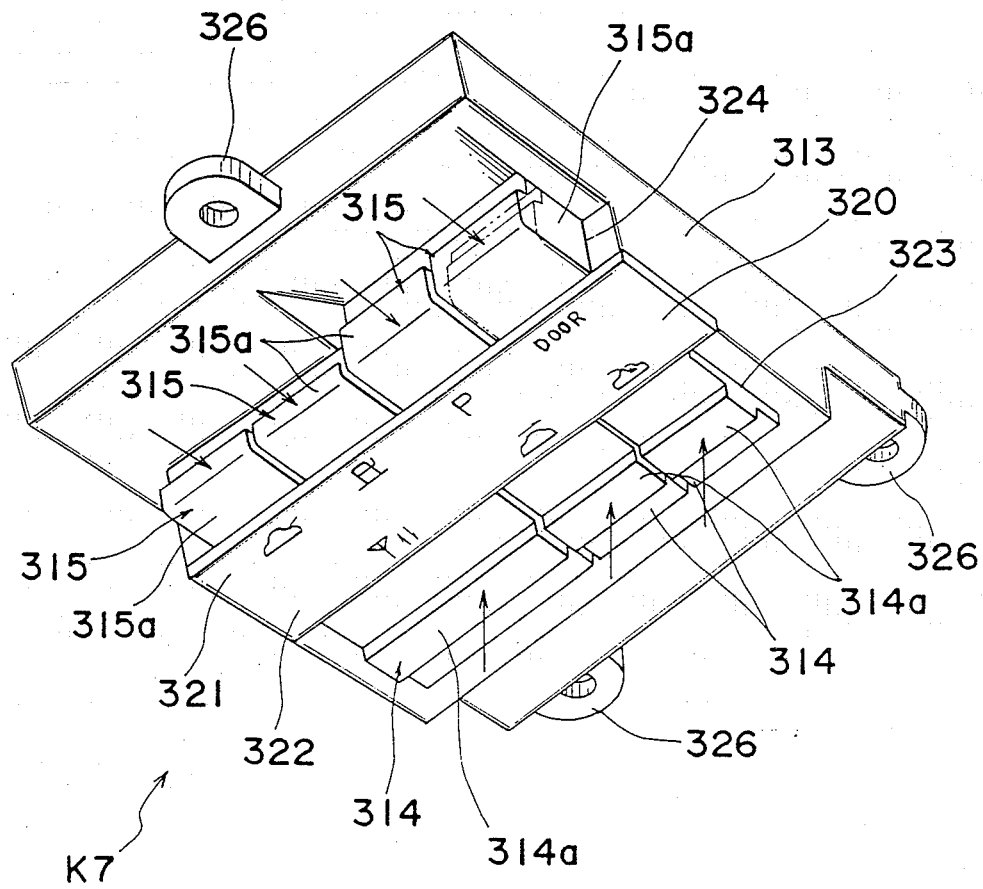
FIG. 20 is a perspective view of a switch control device according to a seventh embodiment of the present invention.
Figure 21:
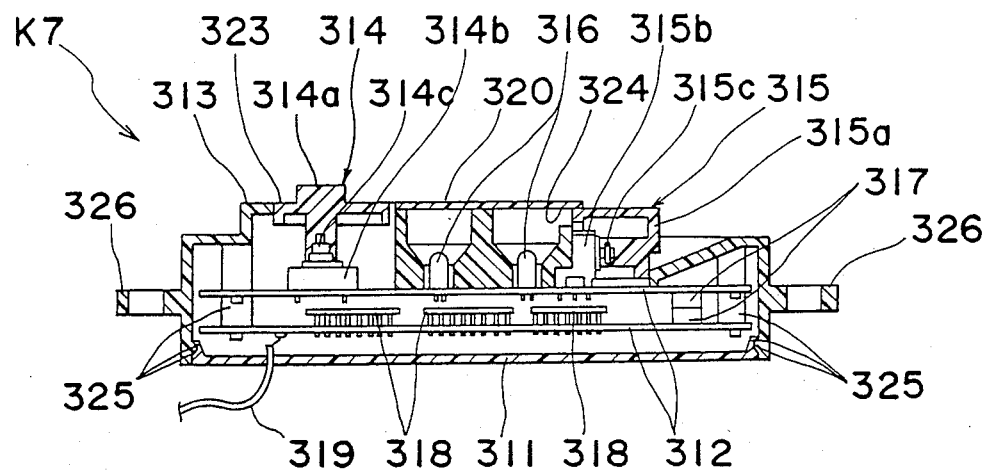
FIG. 21 is a sectional view of the switch control device of FIG. 20.

Referring to FIGS. 20 and 21, there is shown a switch control device K7 according to a seventh embodiment of the present invention. The switch control device K7 is mounted on, for example, a roof panel above a driver's seat of the motor vehicle and is constituted by a base 311, upper and lower printed circuit boards 312 having various control components mounted thereon and a casing 313 for covering the base 311 and the upper and lower printed circuit boards 312. A plurality of push-button switches 314 and 315 for operating various apparatuses of the motor vehicle, LEDs 316 for displaying operational states of the push-button switches 314 and 315, electrically conductive connectors 317, control circuits 318 and a flexible cable 319 for delivering signals out of the switch control device K7 are mounted on the upper and lower printed circuit boards 312. It is to be noted that each of the push-button switches 314 has a front push face to be depressed vertically and each of the push-button switches 315 has a lateral push face to be depressed horizontally.

The push-button switches 314 and 315 are provided, in parallel with each other, in two rows at opposite sides of a display plate 320 provided on a front face of the casing 313 so as to interpose therebetween the display plate 320. The push-button switches 314 each having the front push face which can be depressed more easily than the push-button switches 315 each having the lateral push face are used as running mode switches operable in the running state of the motor vehicle so as to actuate, for example, a room light, a sun roof, an antenna, a rear heater, etc. Meanwhile, the push-button switches 315 each having the lateral push face which is depressed with more difficulty than the push-button switches 314 each having the front push face are used as stop mode switches so as to actuate, for example, a trunk opener, parking, a door, a fuel lid opener, etc.

Furthermore, a stop mode display face 321 and a running mode display face 322 are, respectively, provided at one side portion and the other side portion of the display plate 320 disposed between the push-button switches 314 and 315. Figures depicting symbolically operations and processings of the apparatuses corresponding to the push-button switches 314 and 315, respectively are printed on the stop mode display face 321 and the running mode display face 322 or are printed on seals to be bonded onto the stop mode display face 321 and the running mode display face 322.

Figure 22:
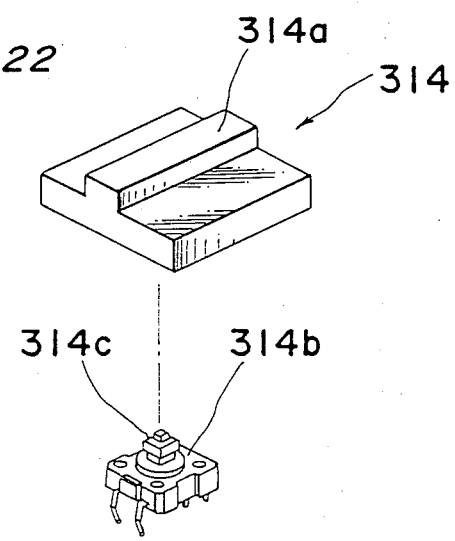
FIG. 22 is an enlarged fragmentary perspective view of a running mode switch employed in the switch control device of FIG. 20.

As shown in FIG. 22, each of the push-button switches 314 each having the front push face includes a push button 314a and a switch body 314b disposed inwardly of the push button 314a. The push button 314a and the switch body 314b are integrally coupled with each other such that a plunger 314c of the switch body 314b is vertically depressed upon vertical depression of the push button 314a.

Figure 23:
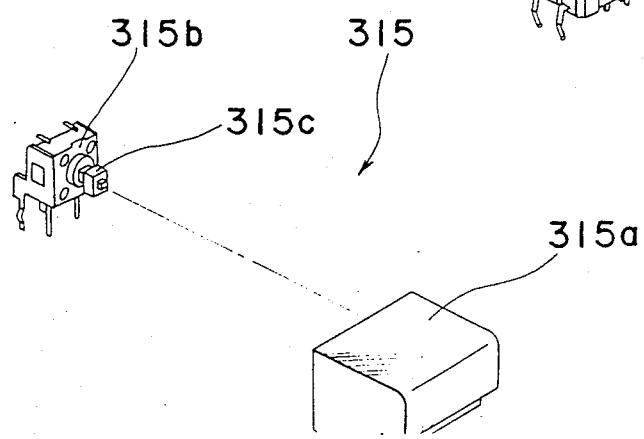
FIG. 23 is an enlarged fragmentary perspective view of a stop mode switch employed in the switch control device of FIG. 20.

Meanwhile, as shown in FIG. 23, each of the push-button switches 315 each having the lateral push face includes a push button 315a and a switch body 315b disposed inwardly of the push button 315a. The push button 315a and the switch body 315b are integrally coupled with each other such that a plunger 315c of the switch body 315b is horizontally depressed upon horizontal depression of the push button 315a. These switch bodies 314b and 315b are soldered onto the upper and lower printed circuit boards 312 in accordance with circuit patterns of the upper and lower printed circuit boards 312.

The casing 313 is formed with a front opening 323 for exposing the front push faces of the push buttons 314a and a lateral opening 324 for exposing the lateral push faces of the push buttons 315a such that the push buttons 314a and 315a confront the LEDs 316 of the push-button switches 314 and 315, respectively. The push buttons 314a are slidably and vertically guided by a peripheral face of the front opening 323, while the push buttons 315a are slidably and laterally guided by a peripheral face of the lateral opening 324. Engageable portions 325 of the base 311, the upper and lower printed circuit boards 312 and the casing 312 are brought into engagement with each other and thermally caulked, so that the base 311, the upper and lower printed circuit boards 312 and the casing 312 are integrally assembled with each other. The casing 313 has three mounting portions 326 to be attached to the roof panel at the front portion of the cabin of the motor vehicle.

Figure 17:
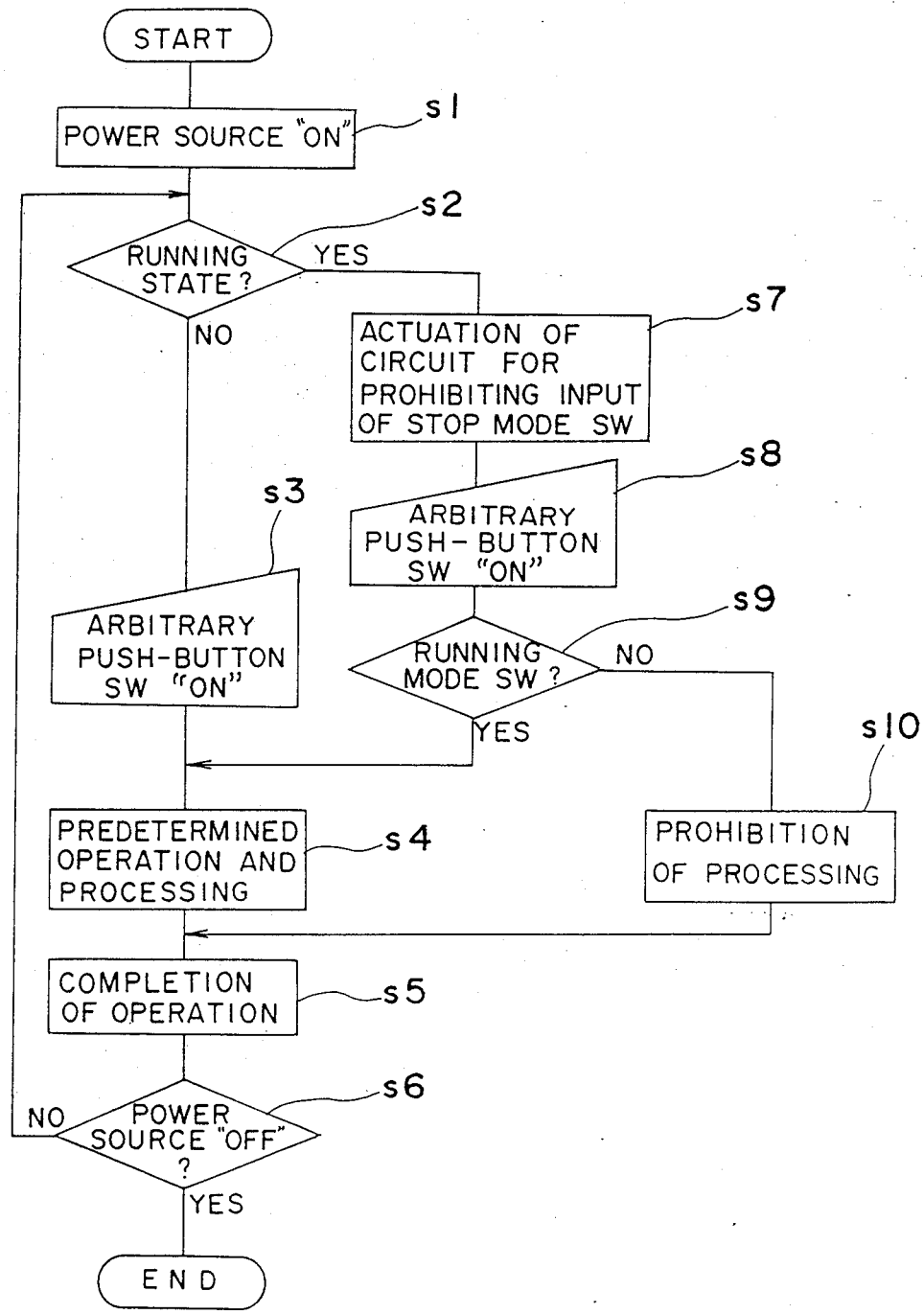
FIG. 17 is a flow chart showing a processing sequence of the switch control device of FIG. 14.

It should be noted that since a control circuit employed in the switch control device K7 and a processing sequence of the switch control device K7 are the same as those of the switch control device K6 shown in FIGS. 16 and 17, respectively, detailed description thereof is abbreviated for the sake of brevity.

Meanwhile, in order to prevent erroneous operation of the stop mode switches more securely, it can also be so arranged as shown in FIG. 20 that the push faces of some stop mode switches for actuating, for example, the trunk opener and the fuel lid opener are made smaller than those of other stop mode switches so as to be operated with more difficulty than those of other stop mode switches.

Furthermore, in order to at all times mount the stop mode switches on an operationally inconvenient side of the mounting position of the running mode switches and the stop mode switches in the cabin, it can also be so arranged that the depression directions of the running mode switches and the stop mode switches are reversed, namely the running mode switches and the stop mode switches have the lateral push faces and the front push faces, respectively.

In the switch control device K7, the depression direction of the stop mode switches is different from that of the running mode switches. Thus, if one of the depression directions, which is manipulated with more difficulty than the other during running of the motor vehicle, is allotted to the stop mode switches, such an undesirable phenomenon does not take place that the stop mode switches are inadvertently operated during running of the motor vehicle, thereby resulting in reduction of erroneous operation of the switches. Accordingly, such a danger is obviated that the trunk opener, etc. to be actuated during stop of the motor vehicle are erroneously actuated, thus ensuring remarkable safety of the motor vehicle and resulting in accurate input operation of the running mode switches.

Although the present invention has been fully described by way of example with reference to the accompanying drawings, it is to be noted here that various changes and modifications will be apparent to those skilled in the art. Therfore, unless otherwise such changes and modifications depart from the scope of the present invention, they should be construed as being included therein.

What is claimed is:

1. A switch control device for a motor vehicle comprising a plurality of switches for actuating a plurality of apparatuses of said vehicle, said plurality of switches comprising at least one stop mode switch and at least one moving mode switch, said device further comprising a means for selectively preventing the at least one stop mode switch or the at least one moving mode switch from being actuated, depending on whether or not the vehicle is in motion.

2. A switch control device as claimed in claim 1, wherein said preventing means does not prevent the at least one stop mode switch or the at least one moving mode switch from being actuated when the vehicle is not in motion.

3. A switch control device as claimed in claim 1, wherein said preventing means prevents only the at least one stop mode switch from being actuated when the vehicle is in motion.

4. A switch control device as claimed in claim 2, wherein said preventing means prevents only the at least one stop mode switch from being actuated when the vehicle is in motion.

5. A switch control device as claimed in claim 1, wherein each of said plurality of switches comprises a pair of contact portions, and said preventing means comprises a shielding plate which can be selectively interposed between the pair of contact portions of the at least one stop mode switch or the at least one moving mode switch, to thereby prevent the at least one stop mode switch or the at least one moving mode switch from being actuated.

6. A switch control device as claimed in claim 5, wherein said shielding plate is not interposed between the contact portions of either the at least one stop mode switch or the at least one moving mode switch when the vehicle is not in motion.

7. A switch control device as claimed in claim 5, wherein said shielding plate is interposed only between the contact portions of the at least one stop mode switch when the vehicle is in motion.

8. A switch control device as claimed in claim 6, wherein said shielding plate is interposed only between the contact portions of the at least one stop mode switch when the vehicle is in motion.

9. A switch control device as claimed in claim 1, wherein each of said plurality of switches comprises a push-button face, and said preventing means comprises a shielding plate which can selectively cover the push-button face of the at least one stop mode switch or the at least one moving mode switch, to thereby prevent the at least one stop mode switch or the at least one moving mode switch from being actuated.

10. A switch control device as claimed in claim 9, wherein said shielding plate does not cover the push-button face of either the at least one stop mode switch or the at least one moving mode switch when the vehicle is not on motion.

11. A switch control device as claimed in claim 9, wherein said shielding plate covers only the push-button face of the at least one stop mode switch when the vehicle is in motion.

12. A switch control device as claimed in claim 10, wherein said shielding plate covers only the push-button face of the at least one stop mode switch when the vehicle is in motion.

13. A switch control method for controlling a plurality of switches for actuating a plurality of apparatuses of a motor vehicle, comprising the steps of:
    separating said plurality of switches into at least one stop mode switch and at least one moving mode switch;
    preventing the at least one stop mode switch or the at least one moving mode switch from being actuated, depending on whether or not the vehicle is in motion.

14. A switch control method as claimed in claim 13, wherein neither the at least one stop mode switch or the at least one moving mode switch are prevented from being actuated when the vehicle is not in motion.

15. A switch control method as claimed in claim 13, wherein only the at least one stop mode switch is prevented from being actuated when the vehicle is in motion.

16. A switch control method as claimed in claim 14, wherein only the at least one stop mode switch is prevented from being actuated when the vehicle is in motion.

* * * * *